(12) United States Patent
Yang et al.

(10) Patent No.: US 12,042,691 B2
(45) Date of Patent: Jul. 23, 2024

(54) MOTION-BASED VIRTUAL-REALITY SIMULATOR DEVICE AND METHOD FOR CONTROLLING THE SAME

(71) Applicant: ELECTRONICS AND TELECOMMUNICATIONS RESEARCH INSTITUTE, Daejeon (KR)

(72) Inventors: Ung-Yeon Yang, Daejeon (KR); Hyung-Ki Son, Daejeon (KR); Hae-Dong Kim, Daejeon (KR); Hong-Kee Kim, Daejeon (KR); Su-Ran Park, Daejeon (KR); Kyung-Ho Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 563 days.

(21) Appl. No.: 17/242,672

(22) Filed: Apr. 28, 2021

(65) Prior Publication Data
US 2021/0370129 A1     Dec. 2, 2021

(30) Foreign Application Priority Data
May 29, 2020   (KR) ........................ 10-2020-0064856

(51) Int. Cl.
*A63B 22/02*     (2006.01)
*A62C 99/00*     (2010.01)
(Continued)

(52) U.S. Cl.
CPC .......... *A63B 22/02* (2013.01); *A62C 99/0081* (2013.01); *A63B 22/0023* (2013.01);
(Continued)

(58) Field of Classification Search
CPC ................................................ A63B 22/02–04
See application file for complete search history.

(56) References Cited

U.S. PATENT DOCUMENTS

| | | | | |
|---|---|---|---|---|
| 6,152,854 A | * | 11/2000 | Carmein | A63G 31/16 198/779 |
| 6,743,154 B2 | * | 6/2004 | Epstein | G06F 3/011 482/54 |

(Continued)

FOREIGN PATENT DOCUMENTS

| | | | | |
|---|---|---|---|---|
| CN | 111773616 A | * | 10/2020 | ............. A63B 22/02 |
| JP | H08280843 A | * | 10/1996 | |

(Continued)

*Primary Examiner* — Nyca T Nguyen
(74) *Attorney, Agent, or Firm* — LRK PATENT LAW FIRM

(57) ABSTRACT

Disclosed herein are a motion-based virtual-reality simulator device and a method for controlling the same. The motion-based virtual-reality simulator device includes a virtual-reality interface for outputting virtual reality content in a form of multi-sense data that is perceptible by a user, a virtual-reality movement implementation unit including a track component for performing continuous track motion in a state in which a user gets on the track component, the track component being configured such that a slope of the track component is controlled while a surface of the track component is deformed into an even surface or an uneven surface, and an interworking control unit for outputting a control signal to the virtual-reality movement implementation unit so that a slope and a surface of the track component are deformed in accordance with the virtual reality content that is output through the virtual-reality interface.

18 Claims, 10 Drawing Sheets

(51) Int. Cl.
  *A63B 22/00*  (2006.01)
  *A63B 71/06*  (2006.01)
  *G02B 27/00*  (2006.01)
  *G06F 3/01*   (2006.01)
  *G09B 9/00*   (2006.01)

(52) U.S. Cl.
  CPC ......... *G02B 27/0093* (2013.01); *G06F 3/016* (2013.01); *G09B 9/00* (2013.01); *A63B 2071/0647* (2013.01)

(56) References Cited

U.S. PATENT DOCUMENTS

| | | | | |
|---|---|---|---|---|
| 11,301,045 | B1* | 4/2022 | Berme | G06F 3/016 |
| 2003/0232698 | A1* | 12/2003 | Couvillion, Jr. | G06F 3/011 |
| | | | | 482/4 |
| 2004/0192511 | A1* | 9/2004 | Ein-Gal | A63B 22/0235 |
| | | | | 482/54 |
| 2013/0281241 | A1* | 10/2013 | Watterson | A63B 22/0285 |
| | | | | 474/237 |
| 2014/0082526 | A1* | 3/2014 | Park | H04L 65/403 |
| | | | | 715/757 |
| 2015/0321337 | A1* | 11/2015 | Stephens, Jr. | A63B 22/0285 |
| | | | | 901/1 |
| 2017/0046600 | A1* | 2/2017 | Lim | G06V 40/23 |
| 2018/0050256 | A1* | 2/2018 | Buvid | G06T 13/40 |
| 2018/0157318 | A1* | 6/2018 | Wang | A63B 71/0054 |
| 2018/0170678 | A1* | 6/2018 | Leong | A63B 22/0285 |
| 2018/0311528 | A1* | 11/2018 | Swarts | A63B 22/0285 |

FOREIGN PATENT DOCUMENTS

| | | |
|---|---|---|
| KR | 10-2012-0117104 A | 10/2012 |
| KR | 10-1433044 B1 | 8/2014 |
| KR | 10-2017-0123083 A | 11/2017 |
| KR | 10-1882765 B1 | 7/2018 |
| KR | 10-2019-0020435 A | 3/2019 |
| KR | 10-2063395 B1 | 1/2020 |

* cited by examiner

MOTION-BASED VIRTUAL-REALITY SIMULATOR DEVICE AND METHOD FOR CONTROLLING THE SAME

CROSS REFERENCE TO RELATED APPLICATION

This application claims the benefit of Korean Patent Application No. 10-2020-0064856, filed May 29, 2020, which is hereby incorporated by reference in its entirety into this application.

BACKGROUND OF THE INVENTION

1. Technical Field

The following embodiments relate to virtual-reality technology.

2. Description of Related Art

A simulator, that is, a virtual reality device, may be divided into a simple experience-type simulator and a tangible motion-based simulator.

The simple experience-type simulator allows a user to experience virtual reality and to feel the sense of reality merely by viewing and listening, without moving the user's body. In contrast, the tangible motion-based simulator is used by adding a motion platform, which is a device for allowing the user to feel a kinesthetic sensation, in order for a user to more ideally accept virtuality as reality than in the case where virtual reality is experienced through the visual and auditory senses and then feel more convincing reality.

Such a tangible motion-based simulator is characterized in that, unlike the simple experience-type simulator in which virtual reality is experienced using images and sounds without moving the user's body, a feeling of motion is added to simple viewing and listening using a motion-based device, which allows the user to move in conformity with objects that are seen and heard through images and sounds, thus allowing the user to more fully accept the virtual environment as reality and more strongly feel the sense of reality.

In the past, in order to implement such a tangible motion-based simulator, a user would experience a virtual sport or the like by experiencing walking using a treadmill machine. However, the conventional technology is limited in that physical location movement of the user necessarily depends only on physical experience in which movement is limited only to the horizontal direction. That is, (vertical) movement between floors, represented by stairs and elevators, uses limited sensory feedback (and is limited to a visual effect). Therefore, there is a limitation on the extent to which the user is capable of experiencing movement in an infinitely variable virtual-reality space.

An additional factor that conventionally limits physical experience of the user is the danger of an accident attributable to unrestricted behavior (i.e., behavior with a higher degree of freedom), such as that performed when participating in virtual reality.

Therefore, required is a virtual-reality interface platform that allows a user to experience movement with a higher degree of freedom without concern about the safety-related accidents in infinitely variable virtual-reality space.

SUMMARY OF THE INVENTION

An embodiment is intended to map a user's limited physical movement behavior to unlimited spatial movement in virtual space when the user's movement-related interaction function is implemented in an immersive virtual environment.

An embodiment is intended to allow a user to receive feedback for various types of physical senses, felt through contact with various geographic features in virtual space while the user is moving in real space.

An embodiment is intended to allow a user's body in real space to naturally experience free movement behavior in a virtual-reality content environment, thus supporting the user who experiences virtual-reality content so that the cognitive feedback level of the user of the virtual-reality content closely matches that of a real environment.

In accordance with an aspect, there is provided a motion-based virtual-reality simulator device, including a virtual-reality interface for outputting virtual reality content in a form of multi-sense data that is perceptible by a user, a virtual-reality movement implementation unit including a track component for performing continuous track motion in a state in which a user gets on the track component, the track component being configured such that a slope of the track component is controlled while a surface of the track component is deformed into an even surface or an uneven surface, and an interworking control unit for outputting a control signal to the virtual-reality movement implementation unit so that a slope and a surface of the track component are deformed in accordance with the virtual reality content that is output through the virtual-reality interface.

The virtual-reality interface may include a Head-Mounted Display (HMD), a speaker for outputting sounds, and a controller for outputting a haptic effect.

The virtual-reality movement implementation unit may include the track component configured to perform the continuous track motion at a speed and in a direction that correspond to a control signal from the interworking control unit, two or more roller components arranged to come into contact with inner surfaces of both ends of the track component and configured to rotate around shafts located at respective centers of the roller components, an inclination controller including multiple support members configured such that first ends of the support members are movably coupled around the shafts and second ends of the support members come into contact with a ground to enable horizontal movement and such that lengths of the support members are adjusted, thus enabling lengths and horizontal positions of respective support members to be controlled in response to a control signal from the interworking control unit, and multiple surface deformers arranged on a surface of the track component at regular intervals, each surface deformer having a hinge structure, a bending angle of which is adjusted in response to a control signal from the interworking control unit.

The virtual-reality movement implementation unit may be configured such that an inner surface of the track component and outer surfaces of the roller components are formed in a sawtooth shape to be engaged with each other.

The inclination controller may include four support members respectively movably coupled to both ends of two respective shafts.

The inclination controller may include two support members respectively movably coupled to both ends of one shaft and one support member movably coupled to a center of an additional shaft.

The motion-based virtual-reality simulator device may further include a first tracking unit for tracking a movement state of the virtual-reality movement implementation unit, a second tracking unit for tracking a movement state of the user, and a human-factor control unit for adjusting a control amount for a stimulus to be provided to the user based on cognitive/human engineering statistical experimental data, wherein the interworking control unit is configured to deliver a result of tracking by the first tracking unit and the second tracking unit to the human-factor control unit, and to control motion of the virtual-reality movement implementation unit based on the control amount for the stimulus to be provided to the user, the control amount being fed back from the human-factor control unit.

The human-factor control unit may feed a motion control amount of the virtual-reality movement implementation unit back to the interworking control unit based on a preset mapping parameter that minimizes a difference between an observation and cognitive sense of the user and a body movement sense of the user with respect to a physical element.

The motion-based virtual-reality simulator device may further include a learning-based optimization unit provided with a database in which pieces of cognitive/human engineering statistical experimental data are stored for respective user groups and configured to update the pieces of cognitive/human engineering statistical experimental data for respective user groups through real-time learning based on a response of the user to a stimulus delivered to the user tracked by the second tracking unit.

The motion-based virtual-reality simulator device may further include a safety-supporting virtual gravity unit for controlling a sense of gravity to be applied to a body of the user.

The interworking control unit may control the sense of gravity to be applied to the body of the user through the safety-supporting virtual gravity unit based on a difference between a slope perceived by the user through the virtual-reality interface and a slope of the track component of the virtual-reality movement implementation unit tracked by the first tracking unit.

The safety-supporting virtual gravity unit may include a user-holding unit for enclosing part of the body of the user, and a connection unit formed of an elastic member for connecting the user-holding unit to a support.

In accordance with another aspect, there is provided a device for implementing virtual reality movement, including a track component configured to perform continuous track motion at a speed and in a direction that correspond to a control signal, two or more roller components arranged to come into contact with inner surfaces of both ends of the track component and configured to rotate around shafts located at respective centers of the roller components, an inclination controller including multiple support members configured such that first ends of the support members are movably coupled around the shafts and second ends of the support members come into contact with a ground to enable horizontal movement and such that lengths of the support members are adjusted, thus enabling lengths and horizontal positions of respective support members to be controlled in response to a control signal, and multiple surface deformers arranged on a surface of the track component at regular intervals, each surface deformer having a hinge structure, a bending angle of which is adjusted in response to a control signal.

An inner surface of the track component and outer surfaces of the roller components may be formed in a sawtooth shape to be engaged with each other.

The inclination controller may include four support members respectively movably coupled to both ends of two respective shafts.

The inclination controller may include two support members respectively movably coupled to both ends of one shaft and one support member movably coupled to a center of an additional shaft.

In accordance with a further aspect, there is provided a method for controlling a motion-based virtual-reality simulator device, wherein the motion-based virtual-reality simulator device includes a virtual-reality interface for outputting virtual reality content in a form of multi-sense data that is perceptible by a user, and a virtual-reality movement implementation unit including a track component for performing continuous track motion in a state in which a user gets on the track component, the track component being configured such that a slope of the track component is controlled while a surface of the track component is deformed into an even surface or an uneven surface, the method including determining a slope of the track component and a surface deformation shape to correspond to the output virtual-reality content, and controlling the virtual-reality movement implementation unit based on a result of the determination.

The method may further include tracking a movement state of the virtual-reality movement implementation unit and a movement state of the user, wherein determining the slope of the track component and the surface deformation shape is configured to deliver a result of the tracking to a human-factor control unit for controlling a control amount for a stimulus to be provided to the user based on cognitive/human engineering statistical experiment data, and to determine motion of the virtual-reality movement implementation unit based on the control amount for the stimulus to be provided to the user, the control amount being fed back from the human-factor control unit.

The human-factor control unit may be configured to feed back a motion control amount of the virtual-reality movement implementation unit based on a preset mapping parameter that minimizes a difference between an observation and cognitive sense of the user and a body movement sense of the user with respect to a physical element.

Determining the slope of the track component and the surface deformation shape may be configured to control the sense of gravity to be applied to the body of the user based on a difference between a slope perceived by the user through the virtual-reality interface and a slope of the track component of the tracked virtual-reality movement implementation unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
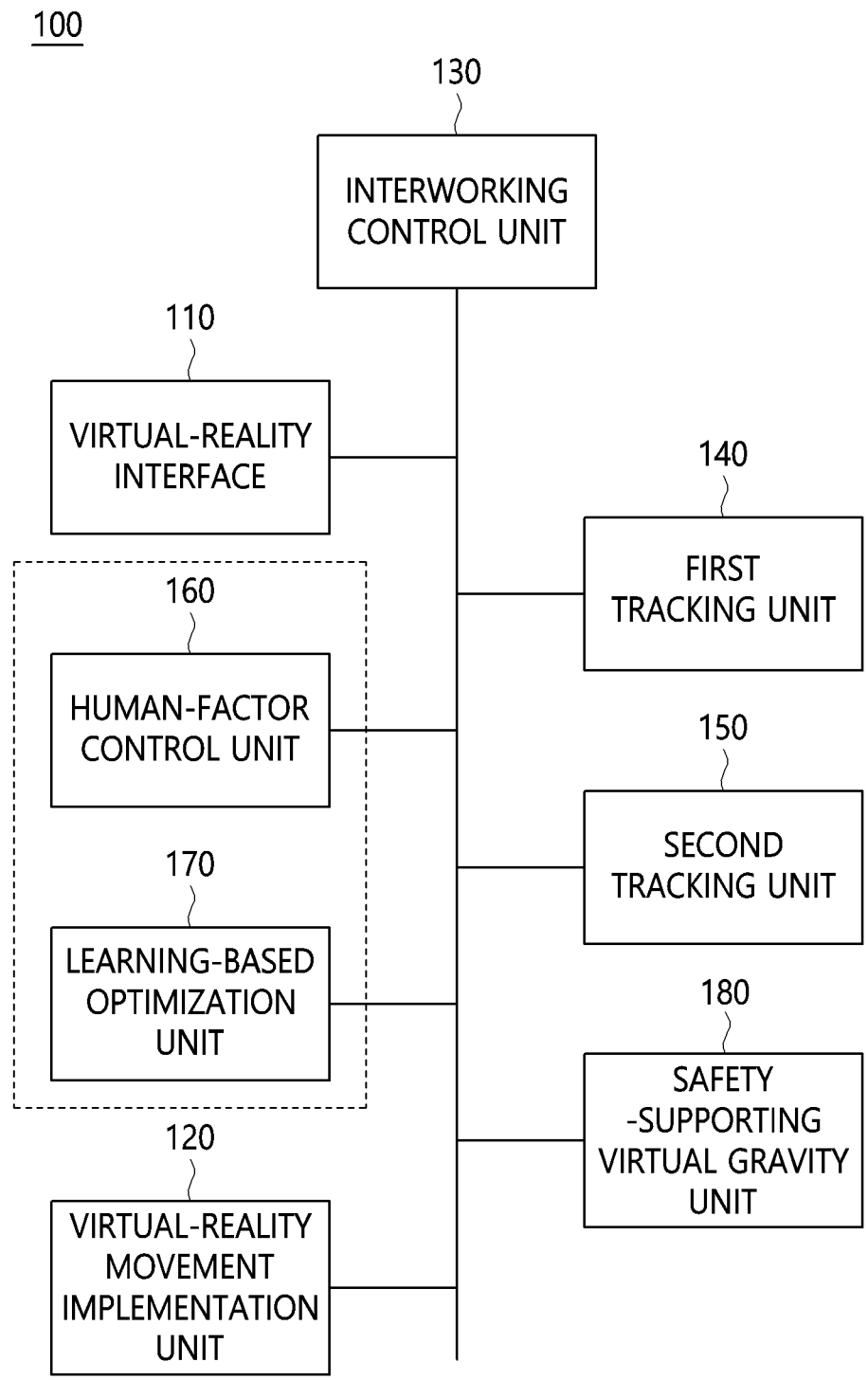
FIG. 1 is a block diagram illustrating the configuration of a motion-based virtual-reality simulator device according to an embodiment.

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present invention pertains. Further, terms defined in generally used dictionaries are not interpreted as having ideal or excessively formal meanings unless they are definitely defined in the present specification.

Hereinafter, a motion-based virtual-reality simulator device, a method for controlling the motion-based virtual-reality simulator device, and a virtual reality movement implementation device according to embodiments will be described in detail with reference to FIGS. 1 to 19.

Figure 2:
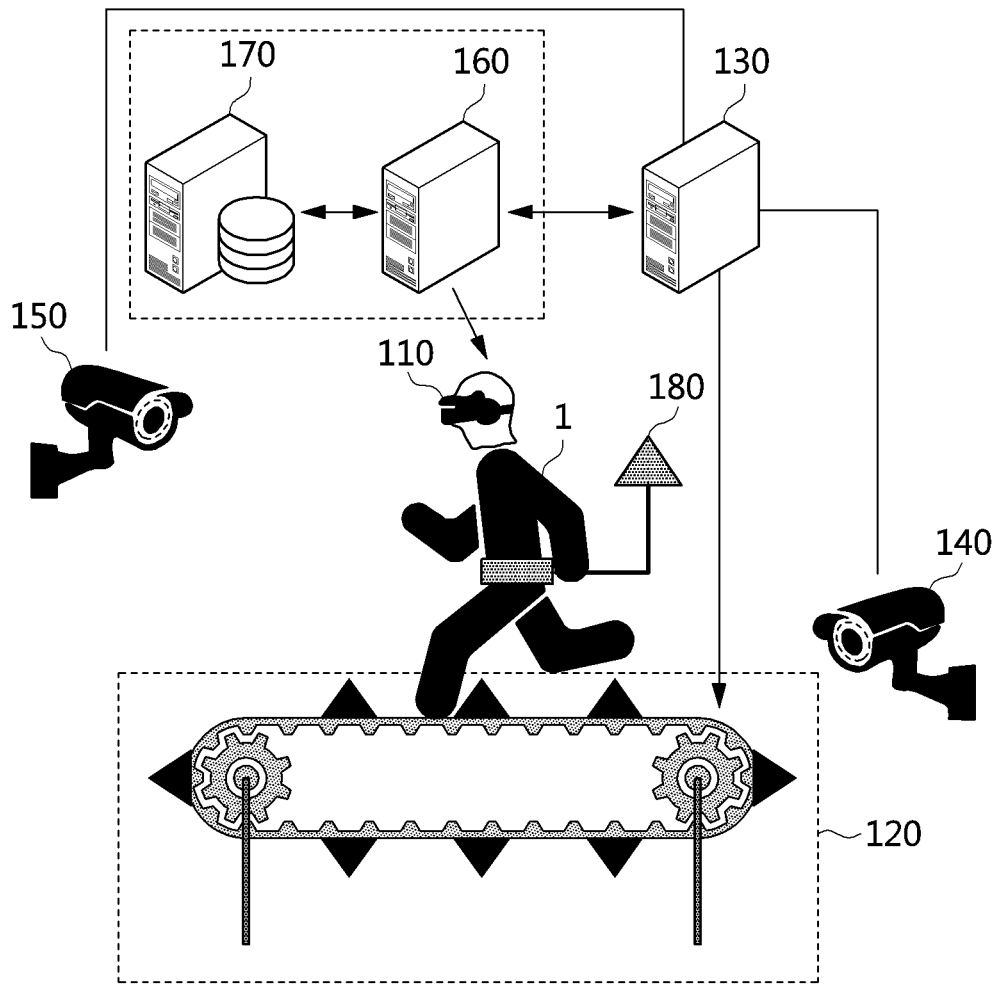
FIG. 2 is a diagram illustrating an example in which a motion-based virtual-reality simulator device according to an embodiment is used.

FIG. 1 is a block diagram illustrating the configuration of a motion-based virtual-reality simulator device according to an embodiment, and FIG. 2 is a diagram illustrating an example in which a motion-based virtual-reality simulator device according to an embodiment is used.

Referring to FIG. 1, a motion-based virtual-reality simulator device 100 may include a virtual-reality interface 110, a virtual-reality movement implementation unit 120, and an interworking control unit 130. In addition, the motion-based virtual-reality simulator device 100 may further include a first tracking unit 140, a second tracking unit 150, a human-factor control unit 160, a learning-based optimization unit 170, and a safety-supporting virtual gravity unit 180.

The virtual-reality interface 110 may output virtual content in the form of multi-sense data including visual sense, auditory sense, and tactile sense that are perceptible by a user.

Here, as illustrated in FIG. 2, the virtual-reality interface 110 may be a Head-Mounted Display (HMD) worn by a user 1. Further, the virtual-reality interface 110 may include a speaker for outputting sounds and a controller for outputting a haptic effect.

The virtual-reality movement implementation unit 120 may be a device for implementing a walking surface with which the user 1 comes into contact, and may enable various body actions, such as walking, running, crawling, and hanging, on the walking surface.

Here, the virtual-reality movement implementation unit 120 may implement a walking surface having an inclination, as well as a walking surface that is a horizontal surface. Here, the inclination may be implemented using an angle of 90° or more.

Also, the virtual-reality movement implementation unit 120 may be implemented such that the walking surface is an uneven surface, as well as an even surface. For example, as the uneven surface, stairs or topographical bends or curves may be implemented. Further, the uneven surface may be implemented to be deformed in accordance with a slope. For example, when the uneven surface indicates stairs, the heights of individual modules can be controlled so that edges of the stairs that are perceived by the user in virtual space are represented in consideration of the slope, an interval between the stairs, and the height of the stairs.

In this way, the user 1 may feel a spatial context in the virtual reality output through the virtual-reality interface 110 as if he or she were actually experiencing the spatial context. Details of the virtual-reality movement implementation unit 120 will be described later with reference to FIGS. 13 and 14.

The interworking control unit 130 controls interworking so that the output of a virtual reality image through the virtual-reality interface 110 and the operation of the virtual-reality movement implementation unit 120 are performed in conjunction with each other within the range of the same content. For example, the interworking control unit 130 may control interworking so that the flow of the time during which images and sounds are output through the virtual-reality interface 110 is synchronized with the time during which the virtual-reality movement implementation unit 120 is operated, thus enabling the virtual-reality movement implementation unit 120 to be moved in accordance with the representation of the images, with the result that the user 1 may naturally experience virtual reality without an unfamiliar sensation.

Here, the interworking control unit 130 may track the movement state of the virtual-reality movement implementation unit 120 using the first tracking unit 140, and may control the movement of an object, represented by the virtual-reality movement implementation unit 120 in virtual content, in two directions depending on the tracked movement state.

Further, the interworking control unit 130 tracks the operation and state information of the user so as to consider the perceptibility and reactivity of the user, which function as variables.

That is, the interworking control unit 130 may track the pose and movement speed of the user 1 using the second tracking unit 150, and may control the movement of the object, represented by the virtual-reality movement implementation unit 120 in virtual content, in two directions depending on the tracked pose and movement speed.

In other words, the interworking control unit 130 tracks the real-time operation situations of the virtual-reality movement implementation unit 120 and the user 1 acquired by the first tracking unit 140 and the second tracking unit 150, delivers the results of the tracking to the human-factor control unit 160, and controls the virtual-reality movement implementation unit 120 in response to a stimulus control signal for virtual experience, which is fed back from the human-factor control unit 160.

Here, the tracking units 140 and 150 may monitor the operations of respective monitoring targets, that is, the virtual-reality movement implementation unit 120 and the user 1, and deliver the results of the monitoring to the interworking control unit 130, and may include multiple sensors or cameras for various respective types.

In an embodiment, each of the tracking units 140 and 150 may be a position sensor or a posture-tracking sensor, which is contained in a monitoring target object or is attached to the monitoring target object. For example, an acceleration sensor, a gyroscope, or the like may be included in each tracking unit.

Furthermore, each of the tracking units 140 and 150 may be a tracking marker corresponding to a sensor installed outside the virtual-reality movement implementation unit 120. For example, each tracking unit may be a camera or the like, which captures an image of the motion of the virtual-reality movement implementation unit 120 illustrated in FIG. 2. In this case, one or more cameras may be provided. Therefore, images of the virtual-reality movement implementation unit 120 may be captured using multiple cameras in multiple directions.

The human-factor control unit 160 adjusts control amounts such as the type and strength of a stimulus to be provided to the user 1 through the virtual-reality interface 110, based on statistical experimental data from the standpoint of cognitive engineering and human engineering. By means of the human-factor control unit 160, the physical limitation of the virtual-reality interface 110 may be overcome, or alternatively, the need to adjust the strength of an arbitrary stimulus to be applied to the user depending on the scenario for providing a virtual content experience may be satisfied.

Also, the human-factor control unit 160 may feed the motion control amount of the virtual-reality movement implementation unit back to the interworking control unit 130 based on a preset mapping parameter which minimizes the difference between the observation and cognitive sense of the user and the body movement sense of the user with respect to a physical element. Details thereof will be described later with reference to FIG. 15.

The learning-based optimization unit 170 is provided with statistical experiment databases (DBs) for respective user groups which present detailed values for human factor control, and may update the statistical experiment DBs for respective user groups through real-time learning based on the user's reaction to the stimulus delivered to the user 1 by operating the motion-based virtual reality simulator device 100. In this way, the learning-based optimization unit 170 functions to improve the level of optimization of multiple target users.

Meanwhile, referring to FIG. 1, the safety-supporting virtual gravity unit 180 may control the amount of gravity to be applied to the body of the user 1.

Here, the interworking control unit 130 may control the sense of gravity applied to the body of the user through the safety-supporting virtual gravity unit 180 based on the difference between the slope perceived by the user through the virtual-reality interface 110 and the slope of the track component of the virtual-reality movement implementation unit 120, tracked by the first tracking unit 140.

That is, in order to deliver adjustable feedback to the perception of the user related to the content experience scenario and the deformation limitation (e.g., a limitation in the representation of an inclination) of the virtual-reality movement implementation unit 120, a function of controlling the amount of gravity to be applied to the user's body is provided. Details of the safety-supporting virtual gravity unit 180 will be described later with reference to FIG. 16.

Figure 3:
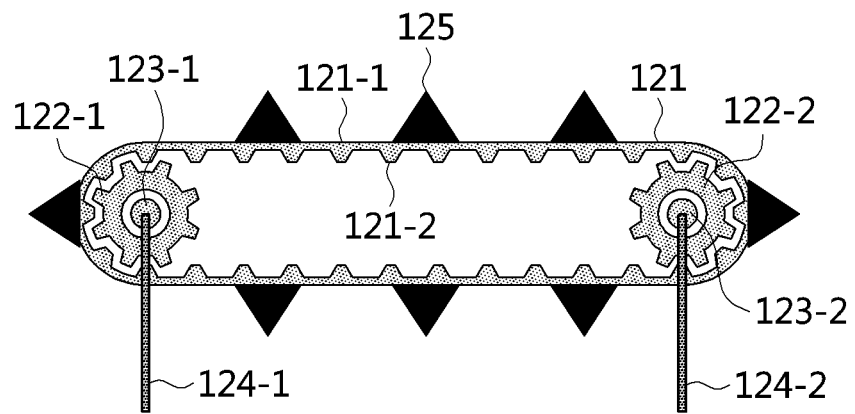
FIG. 3 is a side view of a virtual-reality movement implementation unit according to an embodiment.
Figure 6:
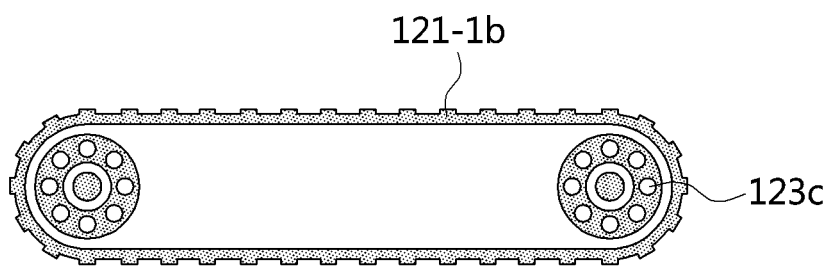
Figure 7:
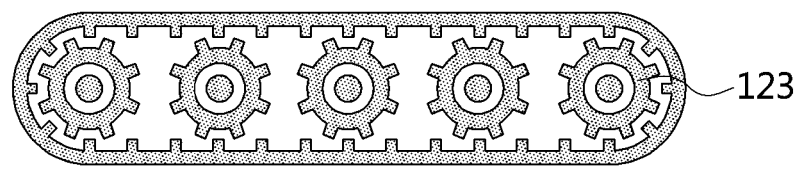
Figure 8:
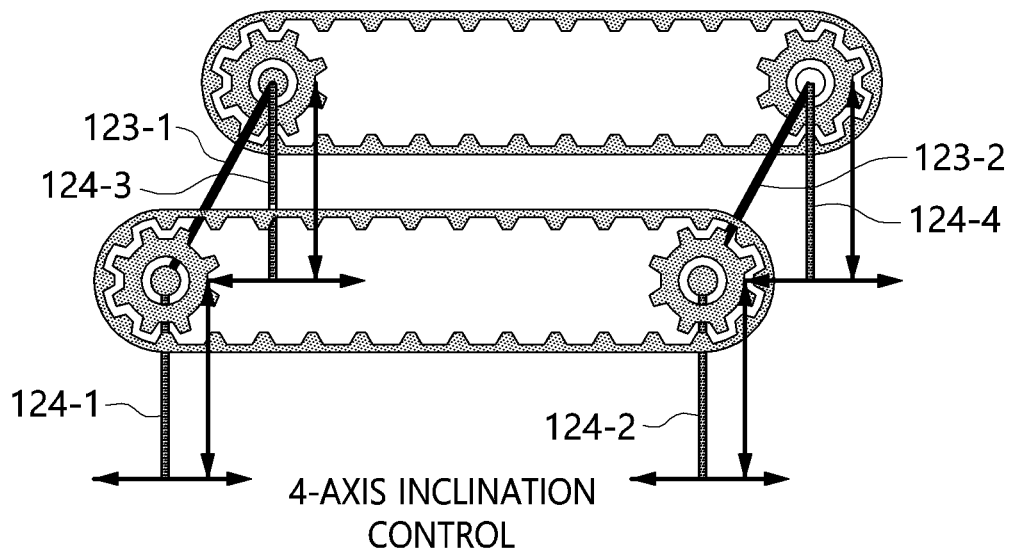
FIGS. 8 and 9 are views illustrating embodiments of an inclination controller of the virtual-reality movement implementation unit.
Figure 9:
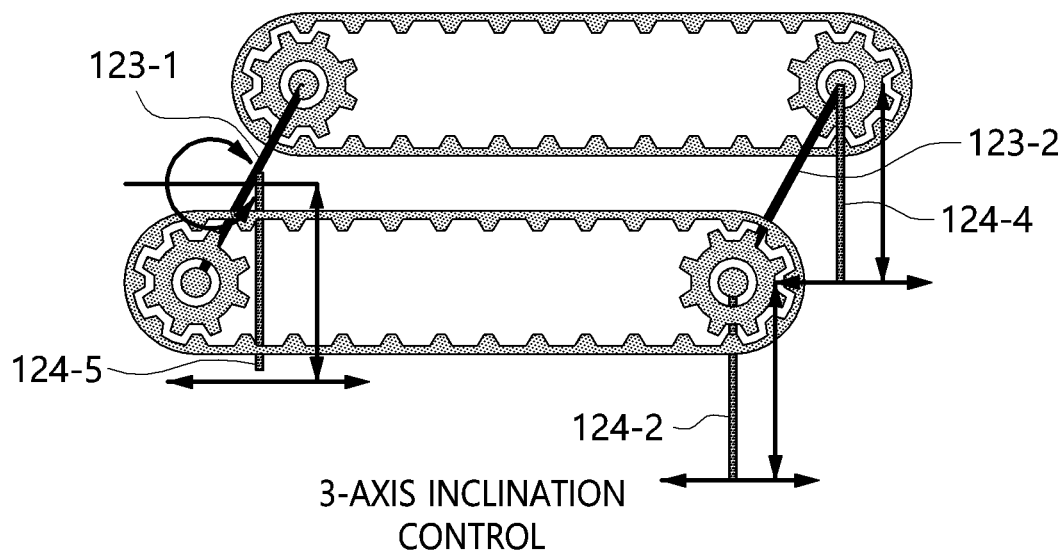
Figure 10:
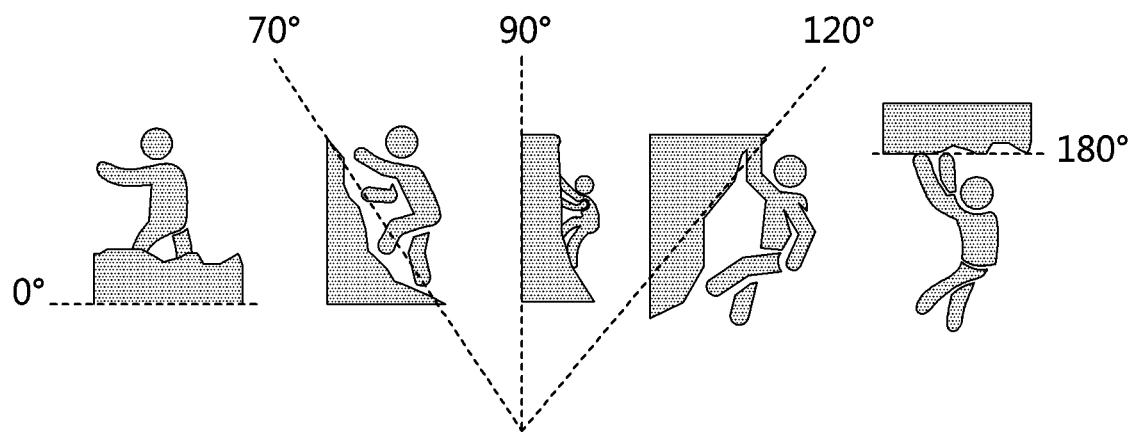
FIG. 10 is a view illustrating an example of a slope realized by the virtual-reality movement implementation unit.
Figure 11:
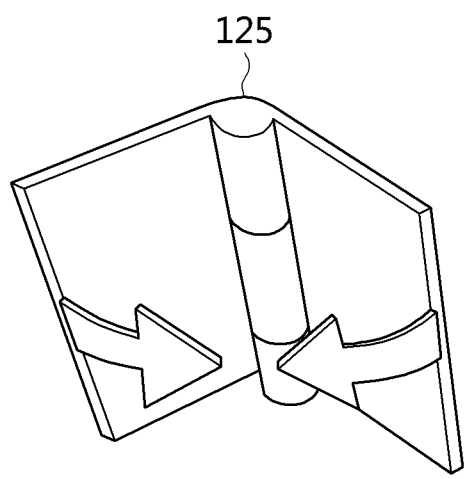
FIGS. 11 to 13 are views illustrating examples of a surface deformer of the virtual-reality movement implementation unit according to an embodiment.
Figure 12:
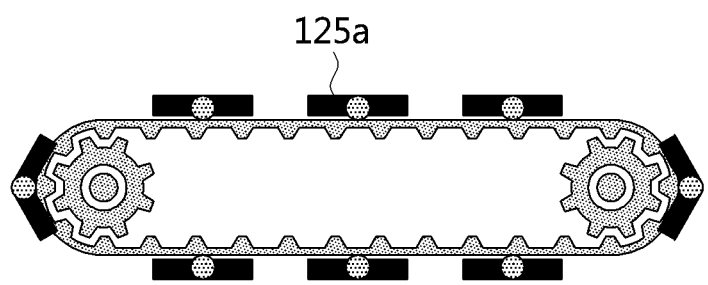
Figure 13:
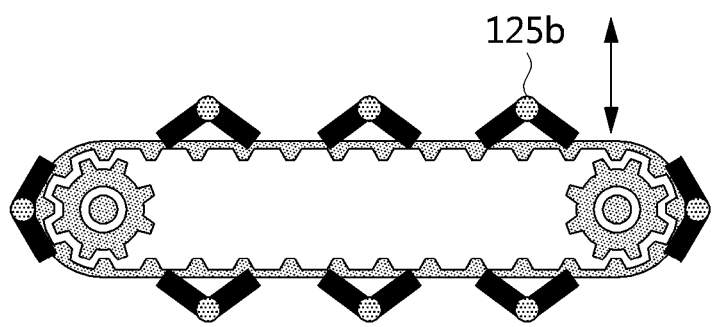
Figure 14:
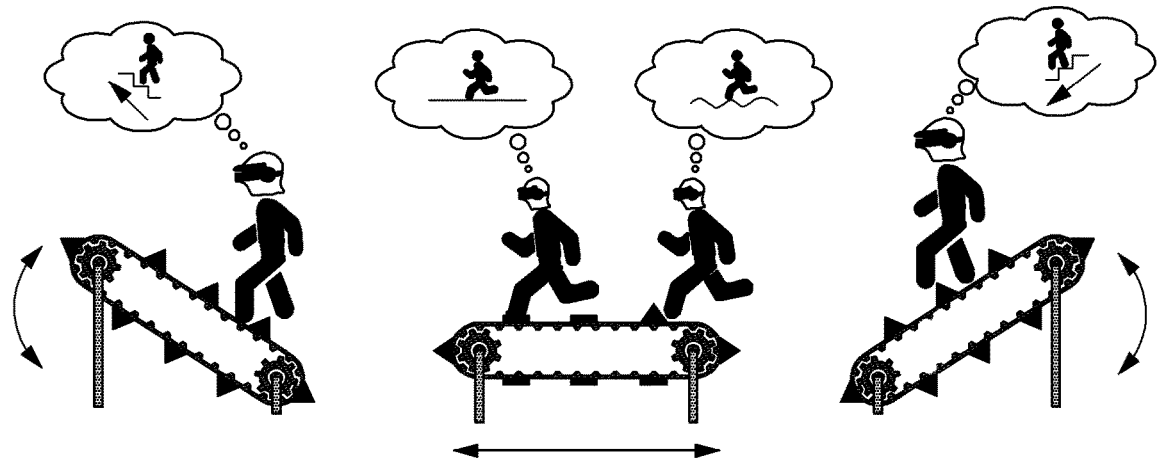
FIG. 14 is a view illustrating an example of a virtual-reality context implemented by the virtual-reality movement implementation unit.

FIG. 3 is a side view of a virtual-reality movement implementation unit according to an embodiment, FIGS. 4 to 7 are views illustrating various embodiments of a track component of the virtual-reality movement implementation unit, FIGS. 8 and 9 are views illustrating embodiments of an inclination controller of the virtual-reality movement implementation unit, FIG. 10 is a view illustrating an example of a slope realized by the virtual-reality movement implementation unit, FIGS. 11 to 13 are views illustrating examples of a surface deformer of the virtual-reality movement implementation unit according to an embodiment, and FIG. 14 is a view illustrating an example of a virtual-reality context implemented by the virtual-reality movement implementation unit.

Referring to FIG. 3, the virtual-reality movement implementation unit 120 may include a track component 121, roller components 123, inclination controllers 124 (124-1 and 124-2), and a surface deformer 125.

The track component 121 is a means for forming a track on which a user 1 is capable of walking or running, and is implemented as a belt, opposite ends of which are connected to each other and side surfaces of which form elliptical shapes. While the track component (i.e., the belt) 12 is rotating, the user 1, who gets on the top of the track component 121, may walk or run in the direction opposite the rotating direction of the track component 121. Here, a structure for implementing movement due to the frictional force formed in the rotation direction on an outer surface 121-1 of the track component 121 or a structure for transmitting a strong force using a gear may be utilized.

Figure 4:
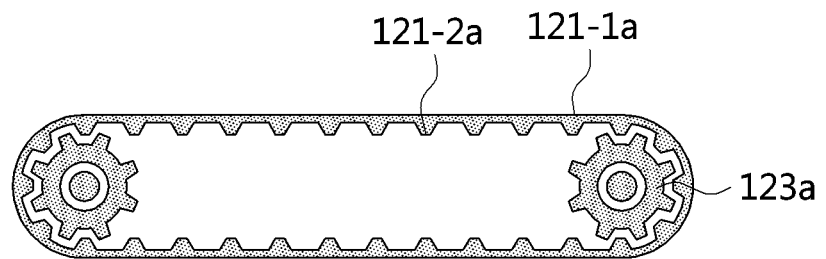
FIGS. 4 to 7 are views illustrating various embodiments of a track component of the virtual-reality movement implementation unit.

Here, as illustrated in FIG. 4, a top surface 121-1a of the track component 121 may have an even shape, or as illustrated in FIG. 6, a top surface 121-1b of the track component 121 may have an uneven shape in which fine irregularities are formed. In this case, different frictional forces may be formed while the user 1 who gets on the top of the track component 121 is walking or running.

Meanwhile, roller components 123 may be implemented such that two or more roller components are arranged to come into contact with both ends of the inner surface 121-2 of the track component 121 and are rotated around respective shafts 123-1 and 123-2 located at respective centers thereof while maintaining the shape of the track component 121.

Also, as illustrated in FIGS. 4 and 7, outer surfaces of roller components 123a may be formed in a sawtooth shape. In this case, an inner surface 121-2a of the track component 121 may also be formed in a sawtooth shape so as to be engaged with the sawtooth shapes of the roller components 123a. Thereby, the track component 121 and the roller components 123a may be rotated while surfaces thereof that touch each other are engaged with each other.

Figure 5:
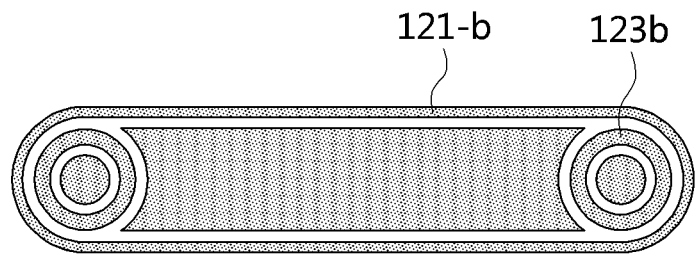

Further, as illustrated in FIGS. 5 and 6, outer surfaces of roller components 123b may be formed to be even. In this case, an inner surface 121-2b of the track component 121 may also be formed to be even in the same manner as the outer surfaces of the roller components 123b.

Meanwhile, as illustrated in FIG. 7, the roller components 123 may be configured using three or more roller components.

Referring back to FIG. 3, the inclination controllers 124 may include multiple support members, first ends of which are movably coupled around the shafts 123-1 and 123-2 and second ends of which come into contact with the ground to enable horizontal movement, thus supporting the track component 121 at a position spaced apart from the ground by a predetermined height.

In this case, the lengths and horizontal positions of respective inclination controllers 124 may be individually controlled, thus enabling the inclination of the track component 121 to be adjusted.

Referring to FIG. 8, in accordance with an embodiment, the inclination controllers 124 may be provided in the form of four axes in which four inclination controllers 124-1, 124-2, 124-3, and 124-4 are connected to both ends of respective shafts 123-1 and 123-2. This may be a structure for controlling the base part of a typical motion platform using three degrees of freedom (DOF) (i.e., pitch-yaw-roll).

In this case, in accordance with an embodiment, each of the four inclination controllers 124-1, 124-2, 124-3, and 124-4 may be configured such that the vertical height and the horizontal position thereof are controlled, thus enabling various inclinations of the track component 121 to be implemented. For example, an inclined surface of 0°, an inclined surface of 70°, and an inclined surface of 90°, such as those shown in FIG. 10, may be implemented. Further, when a left/right position reversing phenomenon depending on the horizontal movement of the inclination controllers 124 is utilized, the context of an overhanging cliff or ceiling may be represented, as in the cases of the inclined surface of 120° and the inclined surface of 180° shown in FIG. 10.

Referring to FIG. 9, in another embodiment, the inclination controllers 124 may be provided in the form of three axes in which inclination controllers 124-2, 124-4, and 124-5 are connected to the center of one shaft 123-1 and both ends of the other shaft 123-2.

Here, the vertical height and the horizontal position of each of the three inclination controllers 124-2, 124-4, and 124-5 may be controlled, thus enabling various inclinations of the track component 121 to be implemented. Further, in the state in which the heights of the inclination controllers 124-2 and 124-4 and the inclination controller 124-5 are controlled, the inclination controllers mutually intersect with the movement of the horizontal positions thereof, thus enabling overhanging inclinations to be implemented. For example, the inclined surface of 70° and the inclined surface of 90°, such as those illustrated in FIG. 10, may be implemented, and in addition, the context of an overhanging cliff or ceiling may be represented, as in the case of the inclined surface of 120° and the inclined surface of 180°, shown in FIG. 10, when a left/right position reversing phenomenon depending on the horizontal movement of the inclination controllers 124-2 and 124-4 and the inclination controller 124-5 is utilized.

Referring back to FIG. 3, the surface deformers 125 are height control members that are provided at regular intervals on the surface of the track component 121, and function to allow the user to feel bends or curves on the ground. That is, the surface deformers 125 are implemented as contact surface implementation elements that deliver feedback for perception of the external shape of a contact surface to portions coming into contact with an arbitrary body part based on the user's feet, and are mutually associated with each other to control contextual information and exchange control information.

In an embodiment, the surface deformers 125 may have shapes that are arranged at predetermined intervals on the surface of the track component 121 and the heights of which are adjusted. Protrusions on stairs, which are formed at regular intervals, or protrusions on the ground surface, which are arranged at irregular intervals, may be variously represented in response to a uniform height control signal or a non-uniform height control signal.

For example, as illustrated in FIG. 11, each of the surface deformers 125 may have a hinge structure, and the height thereof may be controlled by adjusting the bending angle of the hinge structure.

Referring to FIG. 12, each surface deformer 125a may implement an even surface that is not bent, and referring to FIG. 13, each surface deformer 125b may form surface protrusions or stairs by adjusting the bending angle.

Further, although not illustrated in the drawings, the surface deformers may be implemented such that the tops of the surface deformers 125, each having a hinge structure, are covered with an element for smoothing surface bends or protrusions.

The individual elements of the above-described virtual-reality movement implementation unit 120 may be controlled in response to a control signal from the interworking control unit 130, and may be implemented such that the user experiences movement in the context of virtual-reality content, such as by ascending the stairs, running on a ground surface which changes from an even surface to an uneven surface, or descending the stairs, as illustrated in FIG. 14.

Figure 15:
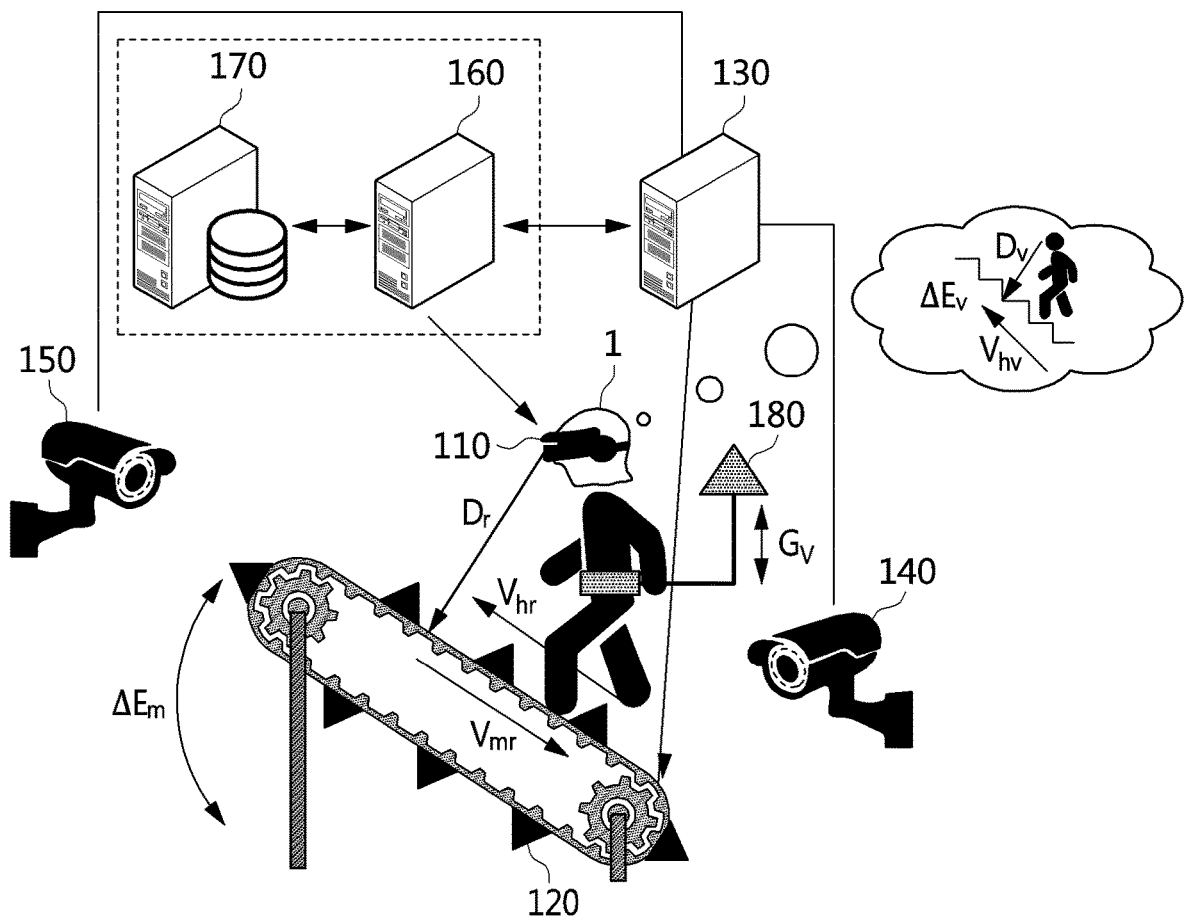
FIG. 15 is a diagram for explaining the operation of a human-factor control unit according to an embodiment.

FIG. 15 is a diagram for explaining details of a human-factor control unit.

Referring to FIG. 15, the human-factor control unit 160 outputs a control amount enabling virtual content output to the virtual-reality interface 110 and the movement state of the virtual-reality movement implementation unit 120 to be simultaneously controlled so that a stimulus for allowing the user to actually feel interaction with a physical environment is identical to a predicted stimulus corresponding to the environment that is visually perceived from the virtual content when the user moves in virtual space having various inclinations and surface shapes.

In this way, a mismatch between real physical space and virtual content space may be eliminated by transmitting corresponding suitable feedback stimulus to human sense organs.

Since physical measurement values (e.g., speed sense, gravity sense, position sense, etc.) in real space may be perceived at different rates by the user 1 in virtual space in which the sense organs are controlled, the movement speed ($V_{mr}=V_{hr}$) of the track component 121 in the virtual-reality movement implementation unit 120 may be represented, unlike the speed $V_{hv}$ represented in the virtual space.

Therefore, a slope $\Delta E_v$ of a contact surface of virtual content which is output through the virtual-reality interface 110 may be represented such that a visual slope $\Delta E_v$ desired to be represented in virtual space can be felt the same as the sense of a real (physical) experience by simultaneously controlling the strength of force with which the user 1 comes into contact with a physical device, that is, the virtual gravity $G_v$ that is required when a control device in real space is utilized, and the slope $\Delta E_m$ of the movement implementation unit 120.

For example, by increasing the height variation $\Delta E_m$ of the movement implementation unit 120 in real space and an incremental acceleration of the virtual gravity $G_v$, the user 1 who experiences virtual content may have a sensation similar to that of ascending stairs having higher slope $\Delta E_v$.

The human-factor control unit 160 assists the perception of a stimulus so that a stimulus in the virtual space can be naturally perceived by controlling output parameters of interface devices, provided to the user in addition to the virtual-reality movement implementation unit 120, through the virtual-reality interface 110.

For example, by adjusting the visualization parameters of an HMD, the distance $D_v$ to a target point in the virtual space perceived by the user 1 can be changed. Accordingly, the ratio of the magnitude of a distance $D_r$ that the user must move through actual body movement in real space to the magnitude of the distance $D_v$ is adjusted, and thus an unfamiliar sensation resulting from the discrepancy between the inclined surface $\Delta E_v$ of the virtual-reality content and the inclined surface $\Delta E_m$ of the virtual-reality movement implementation unit 120 may be minimized.

Figure 16:
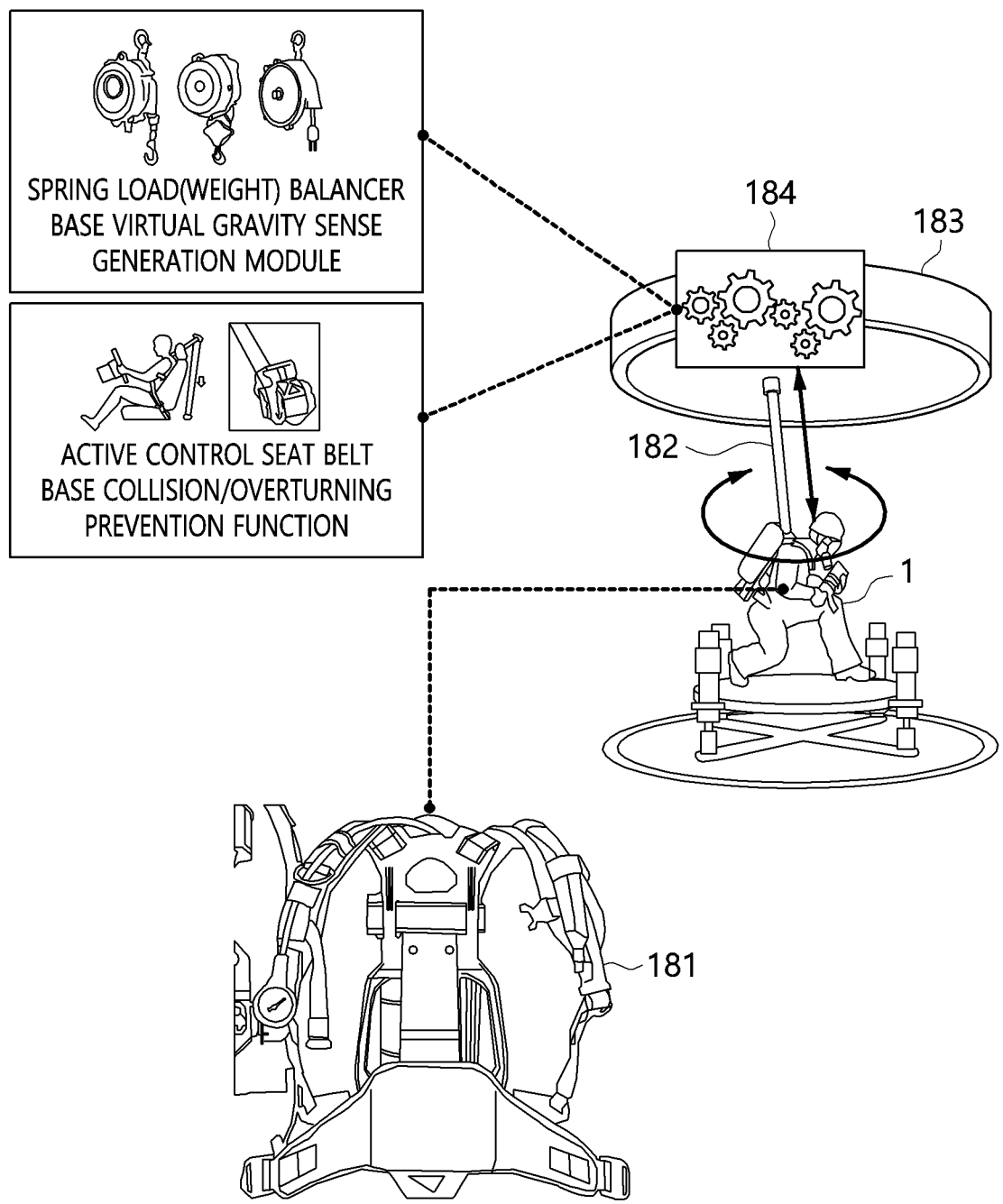
FIG. 16 is a diagram illustrating an example of a safety-supporting virtual gravity unit according to an embodiment.

FIG. 16 is a diagram illustrating an example of a safety-supporting virtual gravity unit according to an embodiment.

Referring to FIG. 16, the safety-supporting virtual gravity unit 180 may include a user-holding unit 181, a connection unit 182, a support 183, and a base virtual gravity sense generation unit 184.

The user-holding unit 181 may be formed to enclose part of the body of the user 1, and may be, for example, a safety belt or a torso-type harness which encloses the waist or torso of the user 1.

The connection unit 182 may be a flexible connector formed of an elastic member which is extended/retracted so as to connect the user-holding unit 181 to the support 183, which is a load. Here, the support 183 may be, for example, a wall, a simulator body, or the like.

Here, when a sensor (not illustrated) for tracking a relative distance between the user 1 and the support 183 is utilized, the intention of the behavior of the user 1, including, for example, forward movement, backward movement, and speed, may be detected. By means of this, the base virtual gravity sense generation unit 184 provides a function of controlling the amount of gravity to be applied to the user's body so as to transmit adjustable feedback to the perception of the user related to the content experience scenario and the deformation limitation (e.g., a limitation in the representation of an inclination) of the virtual-reality movement implementation unit 120.

Figure 17:
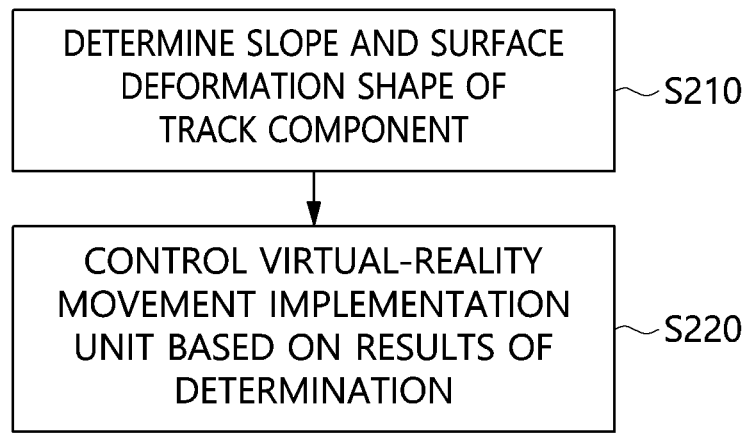
FIG. 17 is a flowchart for explaining a method for controlling a motion-based virtual-reality simulator device according to an embodiment.

FIG. 17 is a flowchart for explaining a method for controlling a motion-based virtual reality simulator device according to an embodiment. This method is performed by the interworking control unit of the above-described motion-based virtual-reality simulator device, and thus repeated descriptions of configurations identical to that of the above description will be omitted.

Referring to FIG. 17, the method for controlling a motion-based virtual reality simulator device may include the step S210 of determining the slope of a track component and a surface deformation shape to correspond to output virtual reality content and the step S220 of controlling a virtual-reality movement implementation unit based on the result of the determination.

The method for controlling a motion-based virtual reality simulator device according to the embodiment may further include the step (not illustrated) of tracking the movement state of the virtual-reality movement implementation unit and the movement state of a user. Here, the determining step S210 may be configured to deliver the results of tracking to a human-factor control unit which adjusts a control amount for a stimulus to be provided to the user based on cognitive/human engineering statistical experimental data, and to determine the motion of the virtual-reality movement implementation unit based on the control amount for the stimulus to be provided to the user, which is fed back from the human-factor control unit.

Here, the determining step S210 may be configured to receive feedback for the motion control amount of the virtual-reality movement implementation unit based on a preset mapping parameter which minimizes the difference between the observation and cognitive sense of the user and the body movement sense of the user with respect to a physical element delivered from the human-factor control unit.

Here, the determining step S210 may be configured to control the sense of gravity to be applied to the body of the user based on the difference between a slope perceived by the user through the virtual-reality interface and the slope of the track component of the tracked virtual-reality movement implementation unit.

Figure 18:
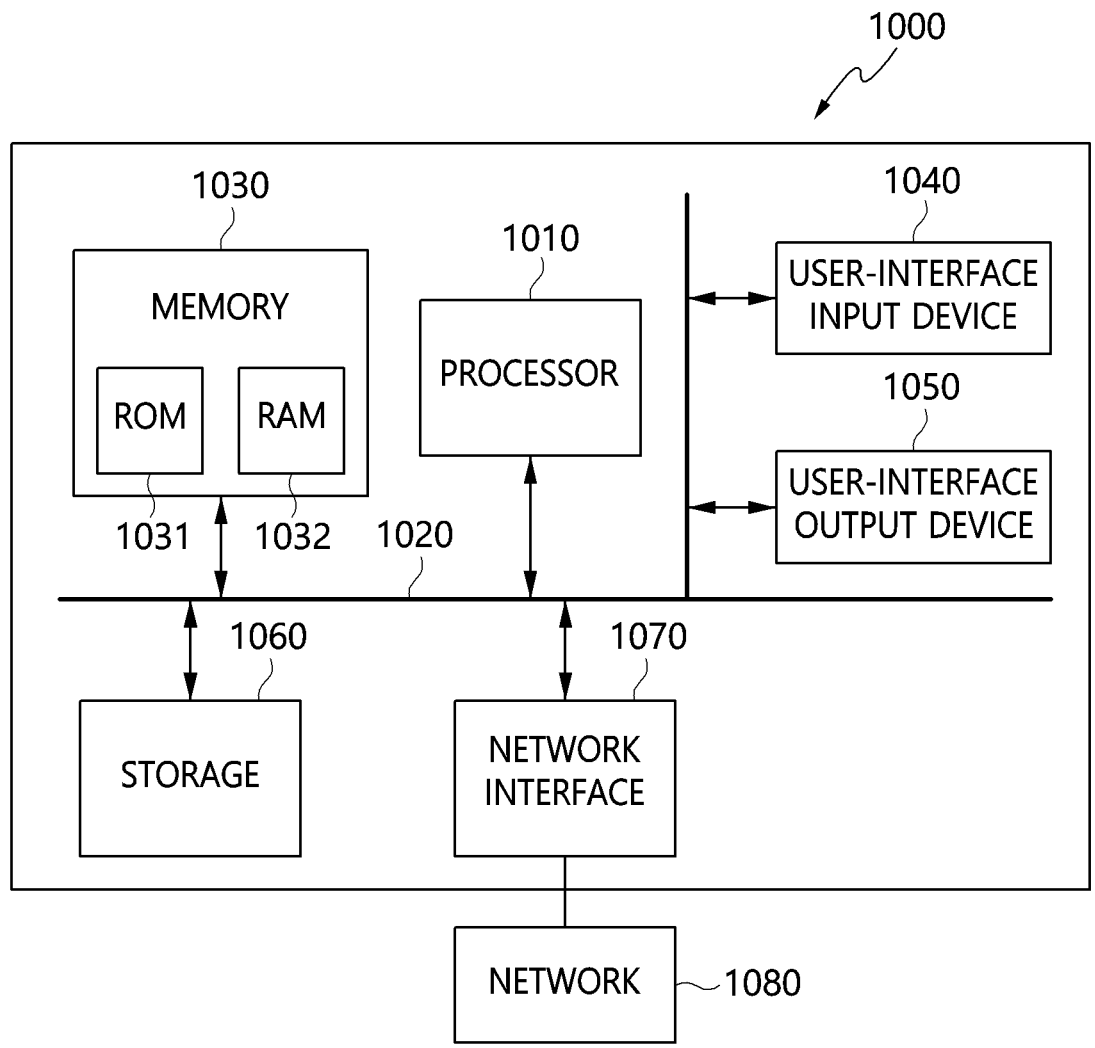
FIG. 18 is a diagram illustrating the configuration of a computer system according to an embodiment.

FIG. 18 is a diagram illustrating the configuration of a computer system according to an embodiment.

The components including the interworking control unit and the human-factor control unit of a motion-based virtual-reality simulator device according to an embodiment may be implemented in a computer system 1000 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, or an information delivery medium. For example, the memory 1030 may include Read-Only Memory (ROM) 1031 or Random Access Memory (RAM) 1032.

Figure 19:
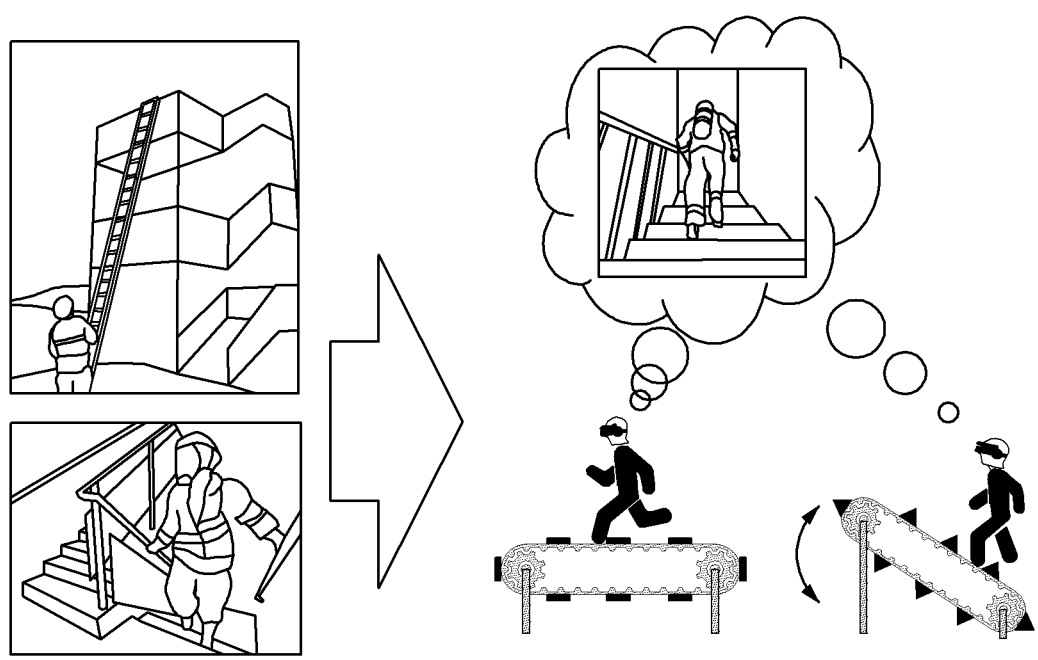
FIG. 19 is a diagram illustrating an example to which the motion-based virtual-reality simulator device according to an embodiment is applied.

FIG. 19 is a diagram illustrating an example in which a motion-based virtual reality simulator according to an embodiment is applied.

Referring to FIG. 19, in the case of firefighter training, there are many cases where stairs are utilized for activity of entering the inside of buildings, and thus fire drills have been practiced using artificial facilities. However, since it is difficult to represent various site situations (contexts) or reproduce various scenes of fires due to the structural/environmental characteristics of artificial facilities (structures), a context having low realism is presented to firefighters who participate in training, thus having limited training effects. Most existing instances in which virtual-reality technology is applied to firefighting training have been developed based on a desktop environment, and thus it is difficult for firefighters to experience movable training for various building structures and various scenes of fires such as those that are capable of being presented using the present invention. Therefore, the present invention shows that a user who wears a virtual-reality interface such as an HMD and is then immersed in virtual firefighting may experience (learn) an action of personally ascending and descending topographical structures (e.g., stairs) having various inclinations.

In accordance with an embodiment, a user may experience various senses interacting with various visually presented surfaces while moving in virtual space through the same physical activity as that in real space.

In accordance with an embodiment, by utilizing the characteristics of virtual-reality interfaces which block sense organs for directly experiencing an external environment and discrepancy characteristics appearing in sense perception processes of respective interfaces, a stimulus situation in an area in which it is difficult for a physical device in real space to represent (i.e., the range of representation deviating from a boundary area) may be represented in virtual content, with the result that the advantage of allowing the user to reduce a limitation in behavior that can be experienced in virtual space can be obtained.

Although the embodiments of the present invention have been disclosed with reference to the attached drawing, those skilled in the art will appreciate that the present invention can be implemented in other concrete forms, without changing the technical spirit or essential features of the invention. Therefore, it should be understood that the foregoing embodiments are merely exemplary, rather than restrictive in all aspects.

What is claimed is:

1. A motion-based virtual-reality simulator device, comprising:
    a virtual-reality interface for outputting virtual reality content in a form of multi-sense data that is perceptible by a user;
    a virtual-reality movement implementation unit including a track component for performing continuous track motion in a state in which the user gets on the track component, the track component being configured such that a slope of the track component is controlled while a surface of the track component is deformed into an even surface or an uneven surface; and
    an interworking control unit for outputting a control signal to the virtual-reality movement implementation unit so that the slope and the surface of the track component are deformed in accordance with the virtual reality content that is output through the virtual-reality interface,
    wherein the virtual-reality movement implementation unit comprises:
    the track component configured to perform the continuous track motion at a speed and in a direction that correspond to the control signal from the interworking control unit;
    two or more roller components arranged to come into contact with inner surfaces of both ends of the track component and configured to rotate around shafts located at respective centers of the roller components;
    an inclination controller including multiple support members configured such that first ends of the support members are movably coupled around the shafts and second ends of the support members come into contact with a ground to enable horizontal movement and such that lengths of the support members are adjusted, thus enabling lengths and horizontal positions of respective support members to be controlled in response to the control signal from the interworking control unit; and
    multiple surface deformers arranged on the surface of the track component at regular intervals, each surface deformer having a hinge structure, a bending angle of which is adjusted in response to the control signal from the interworking control unit.

2. The motion-based virtual-reality simulator device of claim 1, further comprising:
    a first tracking unit for tracking a movement state of the virtual-reality movement implementation unit;
    a second tracking unit for tracking a movement state of the user; and
    a human-factor control unit for adjusting a control amount for a stimulus to be provided to the user based on cognitive/human engineering statistical experimental data,
    wherein the interworking control unit is configured to deliver a result of tracking by the first tracking unit and the second tracking unit to the human-factor control unit, and to control motion of the virtual-reality movement implementation unit based on the control amount for the stimulus to be provided to the user, the control amount being fed back from the human-factor control unit.

3. The motion-based virtual-reality simulator device of claim 2, wherein the human-factor control unit feeds a motion control amount of the virtual-reality movement implementation unit back to the interworking control unit based on a preset mapping parameter that minimizes a difference between an observation and cognitive sense of the user and a body movement sense of the user with respect to a physical element.

4. The motion-based virtual-reality simulator device of claim 2, further comprising:
    a learning-based optimization unit provided with a database in which pieces of cognitive/human engineering statistical experimental data are stored for respective user groups and configured to update the pieces of cognitive/human engineering statistical experimental data for respective user groups through real-time learning based on a response of the user to a stimulus delivered to the user tracked by the second tracking unit.

5. The motion-based virtual-reality simulator device of claim 1, further comprising:
    a safety-supporting virtual gravity unit for controlling a sense of gravity to be applied to a body of the user.

6. The motion-based virtual-reality simulator device of claim 5, wherein the interworking control unit controls the sense of gravity to be applied to the body of the user through the safety-supporting virtual gravity unit based on a difference between a slope perceived by the user through the virtual-reality interface and the slope of the track component of the virtual-reality movement implementation unit tracked by the first tracking unit.

7. The motion-based virtual-reality simulator device of claim 6, wherein the safety-supporting virtual gravity unit comprises:
    a user-holding unit for enclosing part of the body of the user; and a connection unit formed of an elastic member for connecting the user-holding unit to a support.

8. The motion-based virtual-reality simulator device of claim 1, wherein the virtual-reality interface comprises a Head-Mounted Display (HMD), a speaker for outputting sounds, and a controller for outputting a haptic effect.

9. The motion-based virtual-reality simulator device of claim 1, wherein the virtual-reality movement implementation unit is configured such that an inner surface of the track component and outer surfaces of the roller components are formed in a sawtooth shape to be engaged with each other.

10. The motion-based virtual-reality simulator device of claim 1, wherein the inclination controller comprises four support members respectively movably coupled to both ends of two respective shafts.

11. The motion-based virtual-reality simulator device of claim 1, wherein the inclination controller comprises two support members respectively movably coupled to both ends of one shaft and one support member movably coupled to a center of an additional shaft.

12. A device for implementing virtual reality movement, comprising:
a track component configured to perform continuous track motion at a speed and in a direction that correspond to a control signal;
two or more roller components arranged to come into contact with inner surfaces of both ends of the track component and configured to rotate around shafts located at respective centers of the roller components;
an inclination controller including multiple support members configured such that first ends of the support members are movably coupled around the shafts and second ends of the support members come into contact with a ground to enable horizontal movement and such that lengths of the support members are adjusted, thus enabling lengths and horizontal positions of respective support members to be controlled in response to a control signal; and
multiple surface deformers arranged on a surface of the track component at regular intervals, each surface deformer having a hinge structure, a bending angle of which is adjusted in response to a control signal.

13. The device of claim 12, wherein an inner surface of the track component and outer surfaces of the roller components are formed in a sawtooth shape to be engaged with each other.

14. The device of claim 12, wherein the inclination controller comprises four support members respectively movably coupled to both ends of two respective shafts.

15. The device of claim 12, wherein the inclination controller comprises two support members respectively movably coupled to both ends of one shaft and one support member movably coupled to a center of an additional shaft.

16. A method for controlling a motion-based virtual-reality simulator device, wherein the motion-based virtual-reality simulator device includes a virtual-reality interface for outputting virtual reality content in a form of multi-sense data that is perceptible by a user, and a virtual-reality movement implementation unit including a track component for performing continuous track motion in a state in which the user gets on the track component, the track component being configured such that a slope of the track component is controlled while a surface of the track component is deformed into an even surface or an uneven surface, the method comprising:
determining the slope of the track component and a surface deformation shape to correspond to the output virtual-reality content;
controlling the virtual-reality movement implementation unit based on a result of the determination; and
tracking a movement state of the virtual-reality movement implementation unit and a movement state of the user,
wherein determining the slope of the track component and the surface deformation shape is configured to deliver a result of the tracking to a human-factor control unit for controlling a control amount for a stimulus to be provided to the user based on cognitive/human engineering statistical experiment data, and to determine motion of the virtual-reality movement implementation unit based on the control amount for the stimulus to be provided to the user, the control amount being fed back from the human-factor control unit.

17. The method of claim 16, wherein the human-factor control unit is configured to feed back a motion control amount of the virtual-reality movement implementation unit based on a preset mapping parameter that minimizes a difference between an observation and cognitive sense of the user and a body movement sense of the user with respect to a physical element.

18. The method of claim 16, wherein determining the slope of the track component and the surface deformation shape is configured to control the sense of gravity to be applied to the body of the user based on a difference between a slope perceived by the user through the virtual-reality interface and the slope of the track component of the tracked virtual-reality movement implementation unit.

* * * * *